Oct. 8, 1968        E. R. CORDOVA        3,404,566

WIND TEE AND VELOCITY INDICATOR

Filed Sept. 8, 1966        2 Sheets-Sheet 1

INVENTOR.
ELMER R. CORDOVA
BY
Richard D. Law
ATTORNEY

Oct. 8, 1968   E. R. CORDOVA   3,404,566
WIND TEE AND VELOCITY INDICATOR
Filed Sept. 8, 1966   2 Sheets-Sheet 2
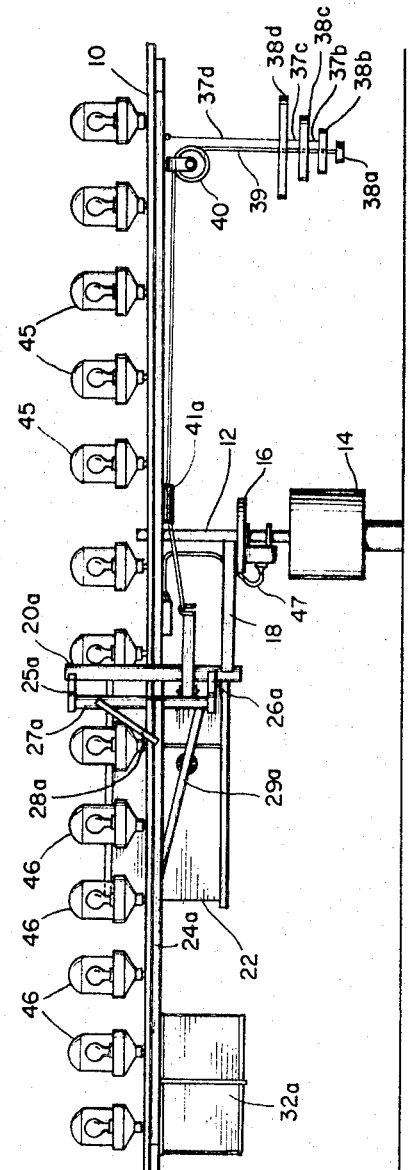
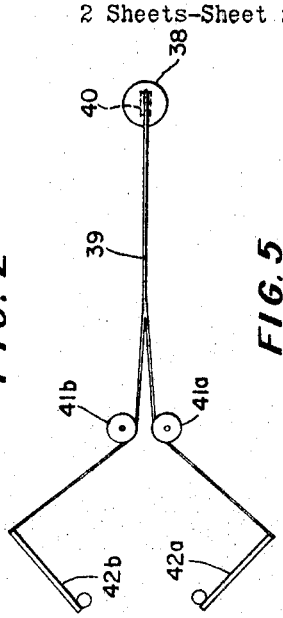
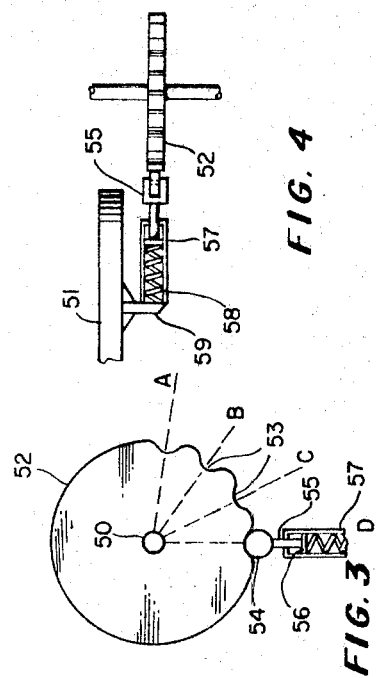
INVENTOR.
ELMER R. CORDOVA
BY
Richard D. Law
ATTORNEY

United States Patent Office 3,404,566
Patented Oct. 8, 1968

3,404,566
WIND TEE AND VELOCITY INDICATOR
Elmer R. Cordova, 5801 S. Santa Fe Drive,
Littleton, Colo. 80120
Filed Sept. 8, 1966, Ser. No. 578,091
9 Claims. (Cl. 73—189)

This invention relates to an airfield wind velocity and direction indicator arranged for both day and night use.

Unattended airfields and airfields or aircraft in which no ground to air radio communication is available for landing aircraft require some sort of wind direction indicator, and it is preferable to provide a wind velocity indicator for landing aircraft. For daytime use most airfields have at minimum a wind sock, which does give the direction of the wind but it is a very poor indicator of wind velocity. Wind tees in common use indicate direction but not velocity of the wind at the airfield. For nighttime, the wind tee may be lighted but a wind sock may be only poorly lighted, thus leaving the wind velocity to the imagination of the landing pilot.

According to the present invention I have provided a simplified wind direction indicator and a velocity indicator which is readily usable and visible from the air, both for day and night use. The device provides a tee with movable fins which are arranged to indicate the relative velocity of the wind in steps of ranges, much in the manner of the wind arrows on a weather map which indicates wind direction and velocity. The device is arranged with lights so that it is readily visible at night to show wind direction and indicate relative velocity of the wind.

Included among the objects and advantages of the present invention is to provide a simplified airfield wind direction and velocity indicator.

Another object of the invention is to provide a wind indicator having movable vanes arranged for stepwise movement for indicating relative velocity of the wind across the airport.

A further object of the invention is to provide a wind velocity and direction indicator which is arranged to be lighted for visibility for pilots above the airfield at night.

Other objects and advantages of the invention may be readily ascertained by referring to the following description and appended illustrations in which:

FIG. 2 is a side elevational view of a wind velocity and direction indicator;

FIG. 3 is an enlarged detail view of a means for providing stepwise movement of the movable fins of a wind velocity and direction indicator according to the invention;

FIG. 4 is a side elevational view of the stepwise means of FIG. 3;

FIG. 5 is a schematic diagram of the counter-balance mechanism for the movable vanes of the invention.

Figure 6:
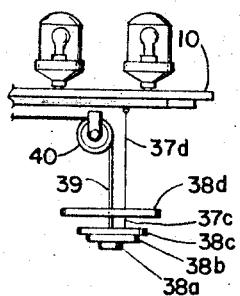
FIG. 6 is a detailed view of the weight system for counter-balancing the vanes in their action in the wind.
Figure 1:
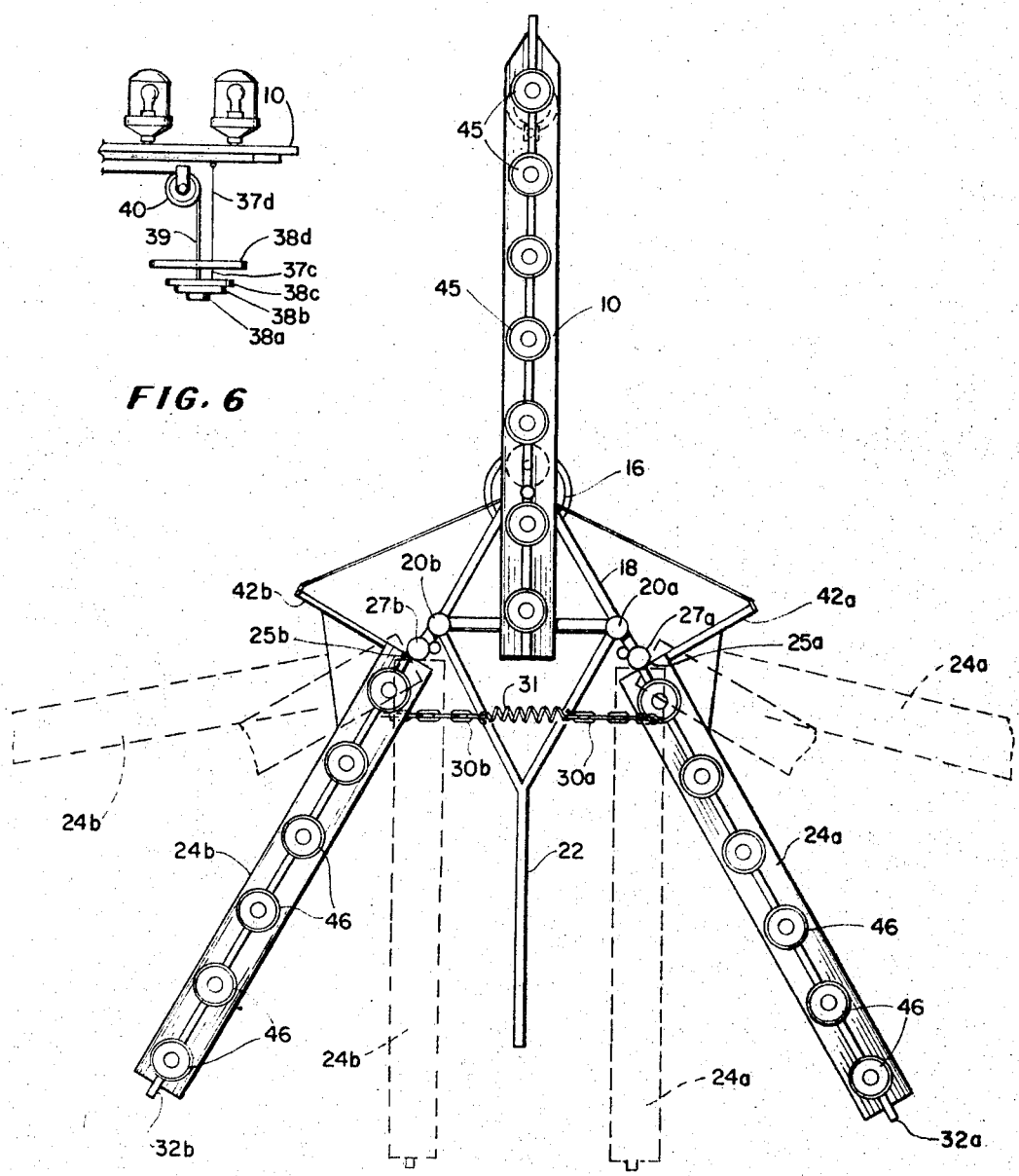
FIG. 1 is a top plan view of a wind direction and velocity indicator according to the invention.

In the embodiment selected for illustration an elongated main body 10 is pivotally mounted on an upright pivot 12 which is mounted in a holder 14 which is secured substantially vertically in the ground. A bearing plate 16 supports the pivotal body 10 by means of a lower bracing framework 18 which extends below the body 10. Attached to the framework 18 are two uprights 20a and 20b which are arranged to support two movable vanes as described below. Extending rearwardly of the body 10 and secured to the lower framework 18 is a rudder 22 which is arranged in fixed position in relation to the body 10 and provides a wind plane for turning the body 10 into the direction from which the wind is blowing.

Movable trailing vanes 24a and 24b are mounted on the upright pivots 20a and 20b by means of a pillow block 25a at the top of the pivot 20a and a pillow block 25b at the top of the upright pivot 20b. A pillow and thrust bearing 26a supports the lower portion of the vane 24a. In a similar manner a pillow and thrust bearing is mounted on the upright 20b to support the movable vane 24b. An upright 27a is secured to the upper pillow 25a and to the lower pillow and thrust bearing 26a and the vane 24a is secured to the upright, with a brace 28a to provide stability for the vane. A lower brace 29a extends from the lower portion of the upright 27a to about halfway back of the movable vane 24a to provide additional stability to the vane. The two trailing movable vanes 24a and 24b are pivotally mounted on the uprights 20a and 20b and are generally biased together to a limited extent by means of a chain 30a at one side and a chain 30b at the other side connected together by means of a helical spring 31 therebetween. This permits the vanes to move from a position in which they are parallel with the main body 10 to a spread-out position where they are approximately perpendicular to a line passing through the main body 10. Each trailing vane includes an adjustable fin 32, as for example the fin 32a on the vane 24a and the adjustable fin 32b on the vane 24b. These fins are arranged to move the vanes under the influence of the wind from the approximately perpendicular or no wind position to the parallel position, and the pressure of the wind determines the angle of the vanes, as will be explained below. The vanes are counter-balanced by stepwise pickup counter-balance weights 38a–38d by a line 39 passing over a pulley 40 to a pair of pulleys 41a and 41b to outrigger arms 42a and 42b. The line 39 is split prior to passing over the two pulleys 41 so that one portion of the line goes to each outrigger, providing equal counter-balancing weights to the two vanes. The counter-balance weights are heavier than the tension on the spring to provide normally spread-apart vanes.

The pickup weights are arranged to increase the counter-balancing weight for the indicator vanes as the wind increases from calm to a set maximum indication velocity. As the vanes move rearwardly under the influence of the wind, the weights are suspended so that only weight 38a is counter-balancing the vanes at position A. When the vanes close to position B weight 38b is picked up by weight 38a, and on further closure weight 38c is picked up at position C. At full parallel closure of the vanes, all the weights are picked up and counter-balance the vanes. To obtain stepwise pickup, weight 38d is suspended on a line 37d from the body 10. The line 39 passes through a hole in each weight and is attached to weight 38a. The weight 38c is suspended from weight 38d by a line 37c, and weight 38b is suspended by line 37b from weight 38c. As weight 38a is moved upwardly, it stepwise picks up the other weights.

A series of lights 45 are mounted on the main frame 10 from front to rear to provide illumination for the same at night, and in the same manner a series of lights 46 are mounted on each of the vanes. A connecting wire 47 provides means for connecting the lights on a pivotal wind tee to a line in the base of the device to the control panel, none of which is shown but is common practice.

One method of providing a stepwise movement of the vanes is illustrated in FIGS. 3 and 4 where the pivot 50 for a vane 51 is provided with a disc 52 having a series of undulations 53 in the edge of the disc. A spring-loaded roller 54 mounted on a support 55 which is secured to a plunger 56 mounted in a tube 57 is held against the disc 52 by means of a helical spring 58 which maintains a pressure of the roller against the disc. The tube 57 is mounted on a bracket 59 which is braced and secured to the vane 51. The indentations 53 in the disc 52 provide temporary stops for the vanes in movement from the fully extended position to the parallel position. As shown in FIG. 3, the extended position will be indicated by letter A, the second step by B, the third step by C, and the parallel or full closure position by letter D. The vane on the other side of the wind tee, of course, has a similar and is a mirror image arrangement, so that both vanes move simultaneously to provide the same angle from a plane passing through the main body 10. As explained above, the counter-balance weights are stepwise picked up, so that the weight for counter-balancing the vanes is stepwise increased for each stop position of the vanes. By adjusting the area of the adjustable fins 32 against the spring tension of the spring 31 and the counter-balance weights 38 a range of wind velocities may be picked so that the roller will rest in the corresponding depression for a particular range. For example, in the depression A the roller will stay in the depression with a wind velocity range from about 0 to 12 knots. Above about 13 knots the roller will move out of the depression under the influence of the wind on the adjustable vane into the next depression, indicated as position B. The vane will remain in this approximate position with the roller in the depression from about 13 or so knots up to about 25. The next step would be set for 26–40 knots. When the wind exceeds 40 knots the vane is moved to parallel position and remains in that position for any velocity thereabove. Thus the angle of the vanes in relation to the body 10 indicates the relative velocity of the wind. The vanes are visible to the pilot in the daytime, which will indicate the approximate velocity of the wind, and when lighted by means of lights 46 for night observation. As is well known, this is important to the pilot, particularly of light aircraft which are subject to different landing characteristics and procedures at different velocities of wind.

The drawings indicate one particular method of providing a stepwise movement of the vanes; however, other means are obviously available to provide a temporary stop for the vanes at particular angles in relation to the main body due to the velocity of the wind. In certain installations, the weights alone may be satisfactory for the stepwise positioning of the vanes. In other instances a single stop between the fully extended position to the parallel position may be provided to indicate a larger range of wind velocities. For example, the extended position may indicate a wind velocity less than 20 knots, the halfway point may indicate a wind velocity of from 40 to 20, and the parallel position indicates winds above 40 knots. Also, other means of suspended and stepwise picking up the weights will be apparent, and are intended to be covered hereby.

The wind tee of the invention is, of course, arranged to pivot 360° to indicate any direction of wind at the airfield. By proper coloring for daytime visibility and by use of proper intensity lamps the wind tee is highly descernible to the pilot flying over or near the airfield. Thus, the pilot may readily establish wind direction and approximate velocity of the wind at the surface for anticipation of his procedures for landing.

While the invention has been illustrated by reference to a particular embodiment, there is no intent to limit the spirit or the scope of the invention to the precise details so set forth except as defined in the following claims.

I claim:

1. A wind direction and velocity indicator comprising an elongated body arranged for pivotal mounting adjacent the upper end on a upright member; a rudder mounted on said body and arranged to plane in wind and point said elongated body windward; a pair of vanes, each mounted adjacent the downwind end of said elongated body and arranged to pivot from an extended position substantially normal to sad body at no wind conditions to a position substantially parallel with said elongated body at high wind conditions; means biasing said vanes toward each other; counter-balance means arranged to bias said vanes in normally extended position in opposition to said means biasing said vanes toward each other; adjustable fins on each said vane for planing in wind and pivoting said vanes in response to wind pressure; means providing stepwise movement of said vanes and each stop of movement corresponding to a predetermined range of wind velocities; and light means mounted on said elongated member and on each said vanes for illuminating said wind direction and velocity indicator at night.

2. A wind direction and velocity indicator according to claim 1 in which said vanes are elongated members pivoted at one end and extending outwardly therefrom.

3. A wind direction and velocity indicator according to claim 1 in which said means biasing said vanes toward each other is a helical spring.

4. A wind direction and velocity indicator according to claim 1 wherein said counter-balance means is at least one weight connected by a line to each said vane, and said weight is suspended below said elongated body.

5. A wind direction and velocity indicator according to claim 4 wherein said vanes include an outrigger arm and said line is connected to said outriggers to provide a mechanical advantage for said weight against said vanes.

6. A wind direction and velocity indicator according to claim 1 wherein said means providing stepwise movement includes a serrated disc mounted on the pivot for each vane and a biased roller mounted on each vane in contact with said disc whereby said serrations temporarily hold said vanes at predetermined positions in relation to ranges of wind velocities.

7. A wind direction and velocity indicator according to claim 6 wherein a series of weights are arranged to be stepwise added to said counter-balance means with an additional weight being added for each serration temporarily holding said vanes.

8. A wind direction and velocity indicator according to claim 1 wherein a plurality of lights are mounted in spaced relation on each of said elongated body and said vanes.

9. A wind direction and velocity indicator according to claim 1 wherein said means providing stepwise movement of said vanes is a series of weights arranged to be stepwise added to said counter-balance means, each addition of weight corresponding to a predetermined range of wind velocities.

References Cited

UNITED STATES PATENTS

| | | | |
|---|---|---|---|
| 1,819,155 | 8/1931 | Fales | 73—189 |
| 1,953,159 | 4/1934 | Eskilson et al. | 73—189 |
| 2,270,120 | 1/1942 | Greene | 73—189 |
| 3,343,412 | 9/1967 | Stout | 73—228 X |

RICHARD C. QUEISSER, *Primary Examiner.*

JERRY W. MYRACLE, *Assistant Examiner.*